March 10, 1970  A. RUSSELL ET AL  3,500,055
MULTITRACK OPTICAL GRATING FOR PROVIDING PHASE-DISPLACED
WAVEFORMS INDICATIVE OF THE POSITION OF A MOVABLE OBJECT
Filed Nov. 30, 1966  3 Sheets-Sheet 1
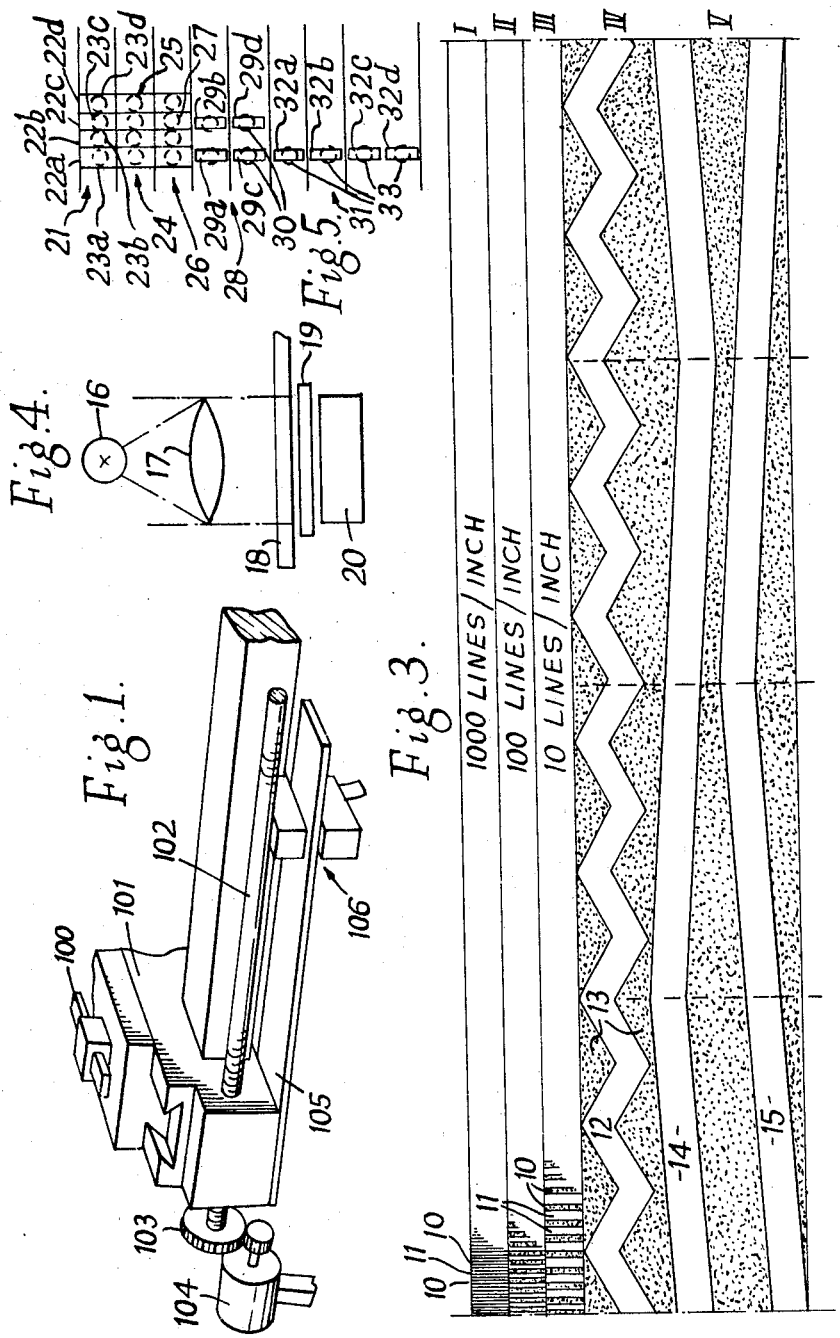

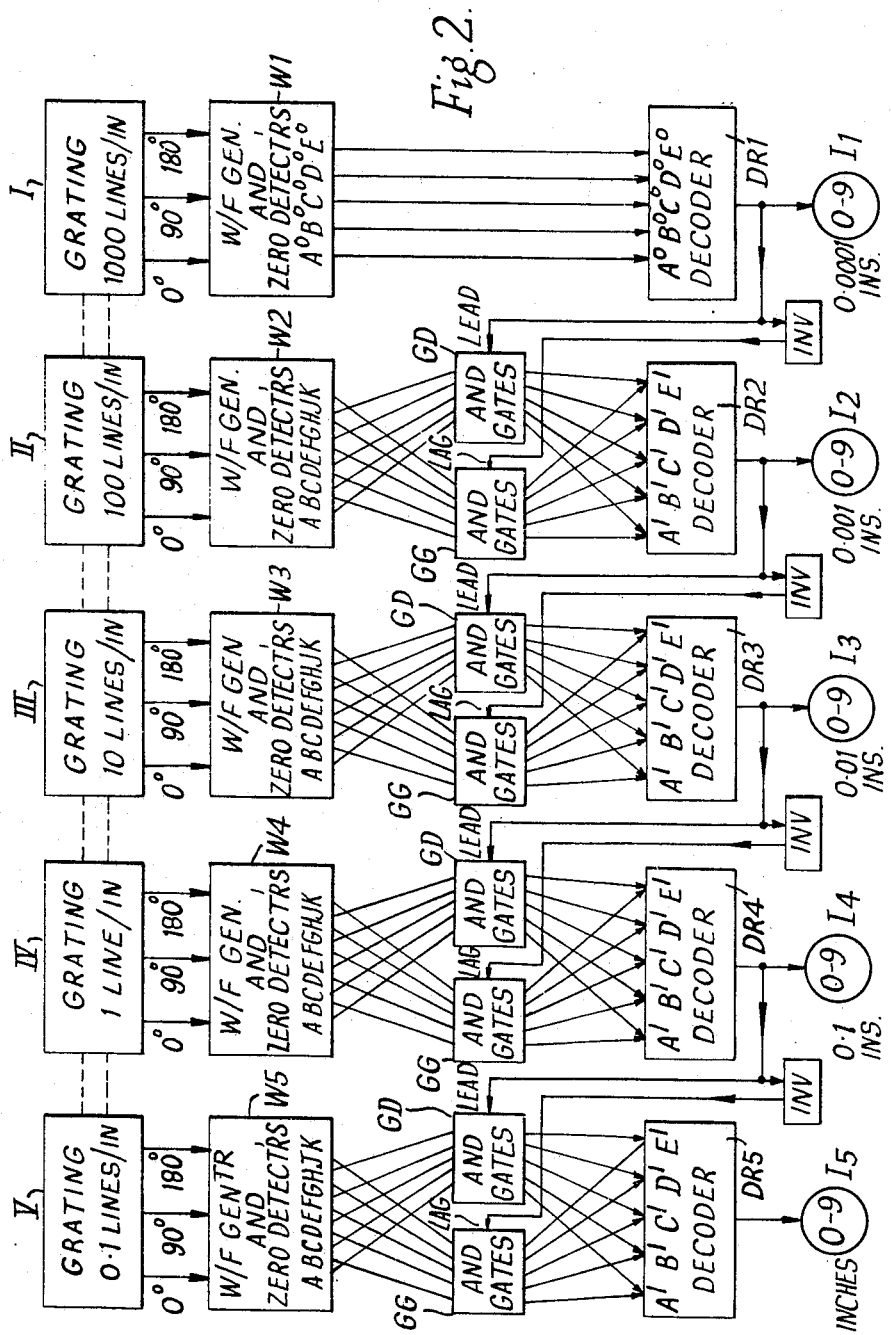

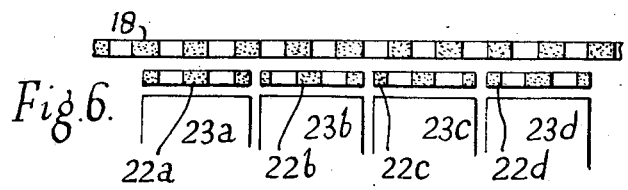
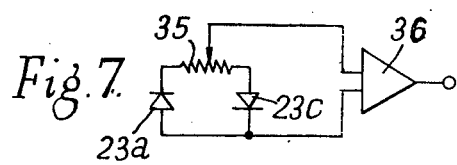
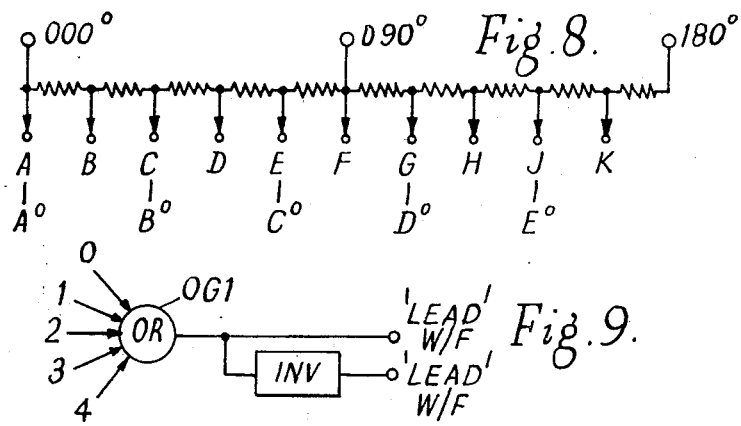
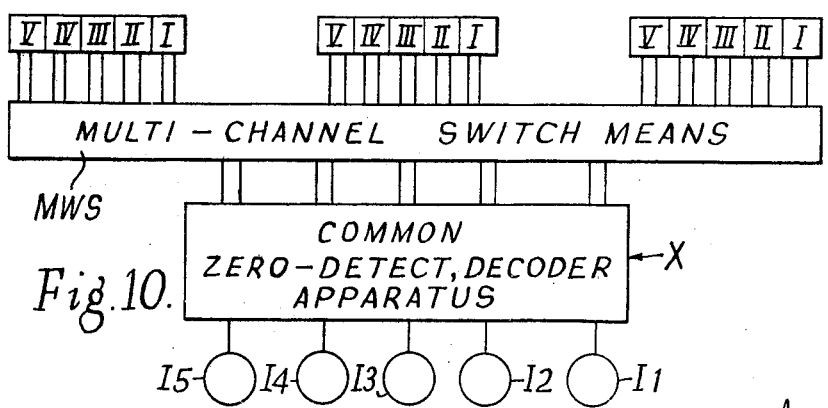

United States Patent Office 3,500,055
Patented Mar. 10, 1970

3,500,055
MULTITRACK OPTICAL GRATING FOR PROVIDING PHASE-DISPLACED WAVEFORMS INDICATIVE OF THE POSITION OF A MOVABLE OBJECT
Alexander Russell and Leonard A. Sayce, East Kilbride, Glasgow, Scotland, assignors to National Research Development Corporation, London, England, a British corporation
Filed Nov. 30, 1966, Ser. No. 597,966
Claims priority, application Great Britain, Dec. 2, 1965, 51,258/65
Int. Cl. H01j 3/14, 39/12
U.S. Cl. 250—237                    14 Claims

ABSTRACT OF THE DISCLOSURE

An arrangement for providing a numerical indication of the absolute position of an object, such as a machine tool, relative to a fixed datum position which comprises a multitrack optical grating and associated photoelectric reading means, the different tracks having respective grating divisions of decimally related dimensional units, and the individual reading means for each track providing a plurality of phase displaced alternating electric signals with each alternation cycle thereof corresponding to object movement equal to one grating division of the related track, a separate multitaped potentiometer network for each track and supplied with plural phase displaced signals obtained therefrom to derive, for each track, at least one family of signals which each alternate in polarity with each cycle corresponding to object movement by the distance of one division of the related grating track, the respective signals of each family being so phase-displaced that the instants of passage of the respective signals through a zero datum level of amplitude correspond to displacement positions of the object which are equally spaced over one division of the related grating track and with the distance between each of such displacement positions equal to the dimensional unit allotted to the numerical indication digit which is of the next lower order of magnitude than the digit related to the particular track and for each track decoder means including logical signal sensing means supplied with different combinations of the related family of signals to provide outputs for controlling a numerical indication of the position of the object within each of the unit divisions of each of said grating tracks.

This invention relates to transducer arrangements for providing a numerical indication of the absolute position, relative to a fixed datum position, of an object, such as a machine tool which is movable along a predetermined path and is more particularly concerned with an improved arrangement employing only optical gratings for providing all of the input positional information regarding the movable object over the whole of the range of movement of the latter. This invention is particularly suitable for use with arrangements of the kind already described in co-pending U.S.A. patent application Ser. No. 570,526, filed Aug. 5, 1966 (by A. Russell), in which a plurality or family of phase-displaced alternating electric signals are derived from an optical grating forming the finest division or least significant digit section of an encoder coupled to the movable object and in which different displacement positions of such movable object are defined by the passage of different ones of said signals through a chosen datum level.

In accordance with the invention a transducer arrangement for providing a numerical indication of the absolute position, relative to a fixed datum position, of an object movable along a predetermined movement path, comprises encoder means including a plurality of optical grating tracks each having associated photoelectric reading means movable relatively to such track in dependence upon the movement of said object, said grating tracks each having a unit grating division dimension related to the dimensional unit alloted to a different one of the digit positions of the required numerical indication and said reading means being each arranged to generate at least two electric signals which alternate in polarity upon relative movement between the related track and its reading means with one alternation cycle corresponding to movement of the object by a distance equal to one grating track division, the generated signals from each reading means being phase displaced relative to one another, means for separately deriving from the phase-displaced output signals from each of said reading means a family of signals which similarly alternate in polarity with each alternation cycle equal to movement of the object by a distance equal to one division of the related grating track, the respective signals of each family being so phase-displaced relatively to one another that the instants of passage of the respective signal amplitudes through a given datum level correspond to different displacement positions of the movable object which are equally spaced over one division of the related grating track and with the distance between each of such displacement positions equal to the dimensional unit allotted to the digit position of the numerical indication which is of the next lower order of magnitude than the digit position related to such track, and decoder means including, for each digit position of the required numerical indication, a plurality of separate signal sensing means arranged each to be supplied with a different combination of the signals of the related family of signals from said encoder means which uniquely defines a different one of the subdivisions of the unit grating division of the related track and each serving to provide a related numerical indication control signal.

In one preferred form of the invention the numerical indication is in the form of a decimal system number whereby the unit grating divisions of the various tracks have a decimal relationship.

In order that the nature of this invention and its various features may be more readily understood a number of embodiments thereof will not be described in conjunction with the accompanying drawings in which:

FIGURE 1 is a largely schematic illustration of a machine tool incorporating a transducer arrangement forming one embodiment of the invention.

FIGURE 2 is a block schematic diagram illustrating the principal components, and their manner of interconnection, of a transducer arrangement as shown in FIG. 1.

FIGURE 3 illustrates a preferred form of the multi-track optical grating for use in the arrangement shown in FIG. 2.

FIGURE 4 shows one form of the electro-optical system used for each photoelectric reading means.

FIGURE 5 is a fragmentary plan view illustrating the disposition of the various photocells and associated index pieces of the reading means with relation to the grating tracks as shown in FIG. 3.

FIGURE 6 is an enlarged scale fragmentary sectional view, taken in the longitudinal direction of one grating track, illustrating the relative positioning of the index pieces associated with the photocells of the reading means.

FIGURE 7 is a fragmentary circuit diagram showing the connections for one pair of photocells of each reading head section.

FIGURE 8 shows a resistance network used for deriving a family of phase-displaced waveforms from the signals generated in each reading head section.

FIGURE 9 illustrates, in block schematic form, the circuit means for deriving the interrogating waveforms used in the decoder means.

FIGURE 10 illustrates, by block schematic diagram, one arrangement by which a common set of equipment comprising waveform generators, zero detectors, decoders and indicators or other utilization means may be employed with a plurality of multitrack transducer devices each associated with a separate movable object.

The embodiment about to be described is one in which the invention is applied to the numerical indication and control of the tool position along one axis of possible tool movement in a numerically controlled tool, specifically a lathe, and employing decimal system numbers.

Referring first to FIG. 1, the tool 100 is mounted upon a slide block 101 and is movable in one linear direction by means of a lead screw 102 which can be rotated either manually or by way of a gear train 103 by a suitable servo or other reversible electric motor 104. To the slide block 101 is attached an elongated grating plate 105 having five separate but parallel grating tracks whose form will be described in detail later.

For co-operation with the tracks of such grating plate 105 there is provided photoelectric reading means which will also be described in detail later and which are indicated generally by the reference numeral 106. Such reading means are secured in fixed position on the stationary bed of the lathe whereby the grating plate moves relatively thereto as the tool 100 is moved along the lathe bed. It will be apparent however that the grating plate may be held stationary and the reading means made movable relatively thereto if desired.

Although, for simplicity of explanation, the invention is shown applied to the numerical indication, for providing a visual indication, of the position of a lathe tool along a single longitudinal predetermined movement path, it will be obvious that similar arrangements may be provided for dealing with other objects which are movable in position relative to a chosen datum position. Moreover, the arrangements may be duplicated or even triplicated to deal with object movement in several directions, e.g., at right angles to one another. The invention is also applicable to radial movement of an object relative to a fixed point.

Referring now to FIG. 2 of the drawings, this illustrates in more detailed block schematic form the arrangements according to one embodiment for providing visual indication of the position of the machine tool 100 in its movement along the linear path defined by controlled movement of the slide block 101.

From each of the five grating tracks I, II, III, IV and V of the grating plate 105, FIG. 1 is derived two electric voltage signals which alternate in polarity upon movement of the tool, one complete alternation cycle of each signal corresponding to movement of the tool by a distance equal to one division of the related grating track. The two signals are 90° phase-displaced with respect to each other and these, together with a further signal 180° phase-displaced with relation to the leading one of the derived signals are applied to waveform generator and zero detector means $W_1$, $W_2$, $W_3$, $W_4$, and $W_5$ respectively. Such generator and zero detector means each have a form substantially similar to that described with relation to FIGS. 1, 2 and 3 of the aforesaid copending application for the least significant grating type encoder track and serve each to provide a family of signals which similarly alternate in polarity (with either a sinusoidal or a triangular waveform of amplitude versus displacement). Each alternation cycle of any signal of one family corresponds to movement of the tool by a distance equal to one division of the related grating track. The different signals of each family are so phase-displaced relatively to one another that the instants of passage of the respective signal amplitudes through a zero datum level correspond to different tool positions which are equispaced over one division of the related grating track.

Each signal of each family is applied to zero-detector means which operate to detect each instant of passage of the applied signal through a zero datum level and the direction of polarity change and therefrom to derive a corresponding family of zero detect waveforms as described and as illustrated in FIG. 4 of the aforesaid copending application. Such zero detect waveforms each have an active or "on" level coincident with the half cycle period of one polarity of the applied family waveform and a zero or "off" level coincident with the other half cycle period of opposite polarity of such family waveform.

The generator and zero-detector means $W_1$ associated with the least significant grating track I provides five output zero-detect waveforms $A^0$, $B^0$, $C^0$, $D^0$, and $E^0$ which, in a manner described later, serve to divide the dimension of the unit division of the grating track I into 10 equal subdivisions within a decoder $DR_1$ whose output signals control the operation of a 10-position indicator $I_1$. Such indicator is conveniently a 10-lamp device but it may take any other suitable form. The remaining waveform generator and zero detector means $W_2$, $W_3$, $W_4$ and $W_5$ are generally similar to the means $W_1$ and each provide ten zero-detect waveforms A–K which serve to divide the related unit grating dimensions of the respective grating tracks II, III, IV and V into 10 equal subdivisions within associated decoders DR2, DR3, DR4 and DR5 thereby to control operation of further 10-position indicators $I_2$, $I_3$, $I_4$ and $I_5$.

FIG. 3 shows a preferred form of the multi-track optical grating suitable for providing absolute positional information to the accuracy of 1 part in 100,000 and comprising the five parallel tracks, I, II, III, IV and V wherein the dimension of the unit grating division of any one track is decimally related to its immediate neighbours. The particular example illustrated is a linear grating for dealing with a 10-inch range of object movement with positional information to an accuracy of 0.0001 inch. While a grating for measurement of movement of position of an object along a rectilinear path is shown and described, it will be self-evident that modification for radial or other measurement is readily possible and that other dimensional ranges and orders of accuracy can be provided.

Track I of the grating comprises a linear band of alternate opaque lines 10 and transparent spaces 11, the lines and spaces being of equal width and with each line/space pair occupying 0.001 inch to provide a unit grating division of that dimension; that the line periodicity of this track I is accordingly 1000 per inch. Track II is similar in form to track I except that it has only 100 line/space pairs per inch to provide a unit grating division dimension of 0.01 inch while track III is likewise similar to tracks I and II except that it has only 10 line/space pairs per inch to provide a unit grating division dimension of 0.1 inch.

Track IV is double the transverse width of any one of tracks I, II and III and consists of a triangular or zigzag shaped transparent band 12 extending longitudinally in an otherwise opaque background 13, the band 12 having a width dimension, measured at right angles to the track axis, which is equal to one half the width of the track and each complete transverse deviation cycle of the zigzag, constituting the unit grating division, being 1 inch in length. The fifth track V is again double the transverse width of the track IV and consists of two triangular or zigzag transparent bands 14, 15 located one in each half-width of the track which is otherwise opaque; band 14, 15 has a width, measured at right angles to the track axis, which is equal to one quarter of the track width. Each transverse deviation cycle of each band 14, 15, i.e., the unit grating division, is of 10 inches dimension while the lower band 15 is so disposed relative to the upper band 14 that its points of similar deviation are 2.5 inches apart, i.e., 90° phase-displaced.

The electro-optical reading head arrangements are shown in FIG. 4 and comprise a suitable light source 16, such as an incandescent electric lamp, and a collimating lens system 17 for directing a parallel light beam through the multiple track grating, indicated generally at 18 and through an adjacent index plate system 19 on to a battery of photocells shown generally at 20. Such photocells, whose precise disposition is described later, may be of any convenient type but photovoltaic cells are particularly suitable.

The index plate system 19 is located at a constant distance approximately 0.03 inch, from the facing surface of the grating 18 while the complete reading head structure is movable relative to the grating in the longitudinal direction of the tracks of the latter. Either the grating or the reading head structure may be normally held stationary and the other coupled to the movable object for movement in unison therewith.

The index plate system 19 comprises five separate sections 21, 24, 26, 28 and 31 for co-operation respectively with the five grating tracks I, II, III, IV and V. Referring now to FIG. 5 the index plate section 21 for co-operation with track I comprises four short portions 22a, 22b, 22c and 22d of the same 1000 line/inch grating formation as the related track, disposed one in front of each of four separate photocells 23a, 23b, 23c, 23d forming part of the battery of photo cells 20. The respective lines of the grating and index portions are precisely parallel but the portions 22a . . . 22d are so displaced in their relationship to one another and the grating lines that each section is 90° phase displaced from the next section as shown to a greatly magnified scale in FIG. 6. In consequence the four photocells generate four 90° phase displaced currents each cycle of which corresponds to a grating movement of 0.001 inch. Owing to Fresnel diffraction imaging of the grating in the plane of the index plate with the afore-mentioned separation of 0.03 inch, the generated currents from this group of photocells are approximately sinusoidal in waveform.

The index plate section 24 for co-operation with track II similarly consists of four short portions of the 100 line/inch grating formation of the related track and each is disposed in front of one of a group of four photocells 25. The portions are phase-displaced in the same manner as already described for the 1000 line/inch sections in conjunction with FIG. 6 whereby four 90° phase displaced waveforms are generated, each cycle of which corresponds to a grating movement of 0.01 inch. Owing to the greater coarseness of the grating track the currents from these cells are, however, substantially triangular in waveform.

The index plate section 26 for co-operation with track III similarly consists of four short portions of the 10 line/inch grating formation of such track III and each is disposed in front of one of a group of four photocells 27. The portions are phase-displaced in the same manner as the two previous sections to cause generation of four 90° phase-displaced currents, each cycle of which corresponds to a grating movement of 0.1 inch. The waveform of each current is triangular.

The index plate section 28 for co-operation with track IV consists of four narrow transparent window apertures 29a 29b, 29c, 29d (FIG. 5), each so located in an opaque mask plate that they lie in front of an associated photocell 30.

The apertures 29a, 29b are in alignment with the upper half of the track width and the other apertures 29c, 29d are in alignment with the lower half of the track width. The centre-to-centre spacing between the apertures 29a, 29b and also that between apertures 29c, 29d is equal to 0.25 inch, i.e., 90° of one deviation cycle of the band 12 and, as the apertures 29a, 29b are aligned respectively with the apertures 29c, 29d transversely of the track, the photocells provide four 90° phase displaced triangular current waveforms each cycle of which corresponds to a grating movement of 1 inch.

The index plate section 31 for co-operation with track V consists of four narrow rectangular transparent window apertures 32a, 32b, 32c and 32d each in front of a related photocell 33. The four windows are in alignment transversely of the track and each embrace one quarter of the track width whereby the photocells behind the two upper windows 32a, 32c in co-operation with the band 14 provide on pair of anti-phase current waveforms and the photocells behind the two lower windows 32b, 32d in co-operation with the band 15 provide another pair of anti-phase waveforms which, owing to the 90° phase displacement of band 15 relative to band 14, are in quadrature to the first pair of waveforms.

In each of the five groups of photocells, those providing one pair of 180° phase displaced waveforms are connected in opposition as illustrated in FIG. 7 with relation to the photocells 23a, 23c co-operating with track I. The other photocells providing the other pair of 180° phase displaced waveforms which are in quadrature to the first pair are similarly arranged. Potentiometer 35 provides for balancing of the cell outputs whereby two output waveforms are finally provided from each four-cell group, such waveforms being in quadrature and unaffected by accidental variation of the light intensity from the source 16.

After amplification of each derived waveform to a level of some ±10 v. by an associated amplifier as shown at 36, FIG. 7 the resultant two waveforms from each group of photocells bear the relationship of 000° (sine) and 090° (cosine) with a very stable zero volts condition (when half light is on each photocell). The 000° waveform is also fed to a further phase inverting amplifier to generate a 180° waveform required for sub-division or interpolation purposes.

From such three waveforms from each track are derived a plurality of further phase displaced waveforms in a manner similar to that already described in the aforesaid copending application by means of a resistance network as shown in FIG. 8 which illustrates the arrangement used for each of tracks II, III, IV and V to provide ten waveforms each phase-displaced by steps of 18°. For the 1000 line/inch track I, wherein only five waveforms phase displaced by 36° are required, the network can be simplified by omitting unwanted tappings as indicated by the second set of references. The resultant family of ten waveforms obtainable from the network as shown in FIG. 8 correspond substantially (apart from the triangular instead of sinusoidal form) with that shown in FIG. 3 of the aforesaid co-pending application.

The zero detector arrangements incorporated in the various means W1 . . . W5 resemble those of the aforesaid copending application and conveniently comprise minimum hysteresis Schmidt trigger circuits. The ten zero-detector output waveform A, B, C, D . . . J, K provided by each of the means W2, W3, W4, W5 have the form as shown in FIG. 4 of the aforesaid copending application. Thus waveform A is at active or "on" level coincident with the 0°–180° part of one grating division cycle, waveform B is "on" from 018°–198° of such cycle and so on. The five zero detector output waveforms A°, B°, C°, D° and E° provided by the means W1 correspond respectively with waveforms A, C, E, G and J of the said FIG. 4 of the copending application.

The decoder arrangements DR1 associated with the least significant track I are of the same general form as is described with reference to FIGS. 4 and 5 of the aforesaid copending application except that only five zero detect waveform inputs (corresponding to inputs WA, WC, WE, WG and WJ shown in the said FIG. 5) are used to control only a single 10-way output indicator equivalent to that of $I_2$ in the same FIG. 5. This results in reduction in number of the NOR gates and other components.

The remaining decoders DR2, DR3, DR4 and DR5 are similar to one another and resemble the arrangements of decoder $DR_1$. The five inputs A′, B′, C′, D′ and E′ are supplied respectively with the zero detector output waveforms A, C, E, G and K by way of a first group of AND gates GD each controlled to be opened when an applied "lead" waveform is at active level and also with the zero detector output waveforms B, D, F, H and K by way of a second group of AND gates GG each controlled to be opened when an applied "lag" waveform is at active level. Such an arrangement, whose operation will be described later, requires only five effective inputs with resultant reduction of size and complexity.

The aforementioned "lead" and "lag" waveforms for controlling the above-mentioned AND gates correspond exactly with the similar waveforms described in the aforesaid copending application and are derived, for each digit section, from the indicator output of the next adjacent section of lower digit significance by circuit arrangements as shown in FIG. 9 where an OR gate OG1 supplied with the "0," "1," "2," "3 and "4" indication signals of, say, indicator $I_1$, provides by its direct output, the "lead" waveform for controlling one group GD of the aforesaid "AND" gates of the decode means for indicator $I_2$ and, by means of an inverted INV, the "lag" waveform for controlling the other group GG of said "AND" gates for the same decode means for indicator $I_2$.

The manner of operation including the alternative control by said "lead" and "lag" waveforms closely resembles that described in the above-mentioned co-pending application and will now be briefly described.

According to the position of the object, e.g., the tool 100 of FIG. 1, measured as a displacement from a given zero or datum position, so the respective three phase displaced waveforms from each of the grating tracks will vary in their relative amplitude values. Thus, if for example, the tool position is 7.4361 inches from the datum position, then the three 000°, 090° and 180° waveforms from the track I grating will provide a first (000°) waveform which is positive-going accompanied by second (90°) and third (180°) phase displaced versions thereof, both of which are negative going. (See FIG. 3 of co-pending application.) In the resultant zero detector output waveforms A° and B° will be "on" and the remaining three waveforms C°, D° and E° will be "off." Such waveforms on application to the decoder circuits $DR_1$ will bring on the indicator or output waveform "1."

A similar operation occurs with each of the other grating tracks with operation of the associated AND gates GD and GG by either the "lead" or the "lag" waveform according to the value of the digit of next lower significance. Thus as the output of the lowest significant digit section of track I is a "1" the "lead" waveform will be "on" and the gates GD associated with the grating track II will be open. Correspondingly, as the indicated digit value from grating track II is "6," the "lag" waveform applied to the AND gates GG and GD associated with grating track III will be operative and the AND gates GG of that section will be opened.

If now the tool is moved to decrease the measured distance to, say, 7.4359 inches, upon movement of the grating track I the zero detector output waveforms will first change to that in which waveform A° is on and waveforms B° . . . E° are off; this alters the indicated count state to "0." Subsequently, on passage of the object through the "0" to "9" change point, the zero detector outputs change to that in which all, including waveforms A° and E° are "off," this alters the indicated count state to "9." Simultaneously, grating track II is altered through the change point between "6" and "5." The actual change of the indicator $I_2$ however is not controlled directly by this change but is basically timed by the "lead" and "lag" waveforms provided from the output of the decoder $DR_1$ of the digit section of lower digit significance. As possible outputs from the zero detector circuits $W_2$ associated with track II are waveform combinations representing two separate count states, namely one provided by the waveforms A, C, E, G and J and another provided by the alternative waveforms B, D, F, H and K. The waveforms A, C, E, G and J will provide an output indication of "6" whereas the output indication provided by waveforms B, D, F, H and K will be "5." Up to the instant when grating track I causes change of the indication "0" to "9" at the exact unit division point, the "lead" waveform from this section is "on" and the gates GD associated with track II are in use to continue the indication "6." When, however, the indication "0" from track I changes to "9" then the "lead" waveform goes off and the "lag" waveform comes on. This causes the alternative AND gates GG to be brought into use thereby to present the alternative indication "5" in exact synchronisation with the change from "0" to "9" on track I. A similar operation occurs in each of the other digit sections with each change in any section controlled, as to its instant of occurrence, by the alteration of the "lead" and "lag" waveform derived from the previous section of next lower digit significance.

Upon object movement in the opposite sense, i.e., with increasing dimension a converse operation ensues. Up to the exact point of changeover from "9" to "0" in grating track I, the AND gates GG of track II are in use to present the indication "5" but this changes to indication "6" exactly in synchronism with the change from "9" to "0" in track I, when the "lead" waveform comes on to open gates GD.

The arrangements according to this invention, in view of the fact that they are dependent upon the continuous nature of the signals being supplied from the reading heads and not upon impulsing as movement occurs through any one track division to the next, may be switched on or off without risk of error. Similarly, power supply variations do not affect the count state. This feature allows arrangements as described to be incorporated in a multiplex system in which one set of electronic equipment including interpolating arrangements, read out systems and indicators or the like is used in conjunction with a plurality of multitrack encoder systems.

One arrangement is illustrated in FIG. 10 where, by means of a suitable multiway switching means MWS, the respective photocell output signals (consisting of two 90° phase displaced signals for each channel) from each of a number of separate machine tools or the like are connectable as required to a single apparatus system X with its associated read-out or other utilization means. Such an arrangement has obvious economic advantage, especially in application of the invention to multitransducer manual or data-logging measuring systems.

With an arrangement using a plurality of separate optical grating tracks as described above, it is not essential that the respective unit divisions of the different tracks should be accurately aligned longitudinally so that at the points of transition, as from "9" through "0" to "1," "99" through "100" to "101" and so on where a change in one track is reflected by carryover changes in the identification controlled by the other tracks. As has been explained in connection with similar arrangements of the aforesaid copending application, "lead" and "lag" switch point transitions of any more significant digit channel should occur at count positions 7 and 2, respectively on the next least significant track, i.e., approximately in the middle of the "off" period of the related "lead" and "lag" waveforms. With the arrangements described when both tracks have been interpolated into ten subdivisions it is necessary only to note, for example, the "lead" transition point of the more significant digit channel and then allocate the value 7 to the less significant digit channel at that point and so on. All tracks may be set up simply by adopting such method of, firstly, accurately subdividing all of the tracks, secondly, noting the switch points of the next to least significant digit track and allocating the values "7" and "2" at these points in the least significant track and then filling in the other values and thirdly noting the switch points on the next more significant track (the third track) and similarly allocating values to the next lower significant track (track 2) and so on throughout all of the remaining tracks.

We claim:

1. A transducer arrangement for providing a numerical indication of the absolute position, relative to a fixed datum position, of an object movable along a predetermined movement path, which comprises encoder means including a plurality of optical grating tracks each having associated photoelectric reading means movable relatively to such track in dependence upon the movement of said object, said grating tracks each having a unit grating division dimension related to the dimensional unit allotted to a different one of the digit positions of the required numerical indication and said reading means being each arranged to generate at least two electric signals which alternate in polarity upon relative movement between the related track and its reading means with one alternation cycle corresponding to movement of the object by a distance equal to one grating track division, the generated signals from each reading means being phase displaced relative to one another, means for separately deriving from the phase-displaced output signals from each of said reading means a family of signals which similarly alternate in polarity with each alternation cycle equal to movement of the object by a distance equal to one division of the related grating track the respective signals of each family being so phase-displaced relatively to one another that the instants of passage of the respective signal amplitudes through a given datum level correspond to different displacement positions of the movable object which are equally spaced over one division of the related grating track and with the distance between each of such displacement positions equal to the dimensional unit allotted to the digit position of the numerical indication which is of the next lower order of magnitude than the digit position related to such track, and decoder means including, for each digit position of the required numerical indication, a plurality of separate signal sensing means arranged each to be supplied with a different combination of the signals of the related family of signals from said encoder means which uniquely defines a different one of the subdivisions of the unit grating division of the related track and each serving to provide a related numerical indication control signal.

2. A transducer arrangement according to claim 1 in which the signals provided by said photoelectric reading means comprise two signals which are in quadrature.

3. A transducer arrangement according to claim 2 in which said photoelectric reading means comprise, for the generation of each of said phase-displaced signals, a pair of photosensitive cell devices so positioned relative to each other with respect to the co-operating grating track that the respective signals therefrom are 180° phase displaced, and means for connecting the output signals from said cell devices in opposition to form the generated output signal.

4. A transducer arrangement according to claim 3 in which said means for connecting said cell device outputs in opposition includes a balancing circuit element.

5. A transducer arrangement according to claim 1 in which said photoelectric reading means include, for at least one grating track, a light source and collimating optical lens system on one side of the grating and a plurality of photocells on the opposite side of the grating together with a separate index plate located between said track and each of said photocells, each of said index plates having a transparent/opaque pattern corresponding to the associated track and disposed parallel therewith.

6. A transducer arrangement according to claim 3 in which said photocell devices each comprise a photovoltaic cell.

7. A transducer arrangement according to claim 1 wherein at least one of said grating tracks comprises a linear band of alternate opaque and transparent lines of equal width, each line pair having a combined width dimension equal to the unit grating division of such track.

8. A transducer arrangement according to claim 1 wherein at least one of said grating tracks comprises a triangular or zigzag shaped transparent band extending longitudinally in an otherwise opaque track, said band having a width dimension measured at right angles to the track axis which is one half of the total deviation amplitude of the band, each complete deviation cycle of said band corresponding to the unit grating division of such track.

9. A transducer arrangement according to claim 1 wherein at least one of said grating tracks comprises a pair of triangular or zigzag shaped transparent bands each located in opposite halves of an otherwise opaque track, each of said bands having a width dimension measured at right angles to the track axis which is equal to one quarter of the track width, the complete deviation cycle of each band corresponding to the unit grating division of such track and the points of similar deviation in each track being displaced from one another in the direction of the track axis by a dimension equal to one quarter of the deviation cycle dimension.

10. A transducer arrangement according to claim 1 in which each of said derived signals of each family of signals is applied to means for detecting the zero amplitude instants in said signal and therefrom generating an output zero-detect signals having one constant level of amplitude when said derived signal is of one polarity and a second constant level of zero amplitude when said derived signal is of opposite polarity.

11. A transducer arrangement according to claim 10 in which said zero detecting means each comprise a low hysteresis Schmitt trigger circuit.

12. A transducer arrangement according to claim 1 in which said signal sensing means of said decoder means each comprise a logic circuit arrangement of solid state devices.

13. A transducer arrangement according to claim 1 in which said decoder means are arranged to provide at each subdivision position of the grating two indication control signals for adjacent indication numbers and means for selecting one of such indication signals under the control of a signal developed in the decoder means associated with the digit of the next lower significance and identifying the instant of passage of the track reading of such lower significance digit from one unit value to the next.

14. A transducer arrangement in accordance with claim 1 in which a plurality of groups of signals derived from grating tracks associated respectively with different movable objects are arranged to be applied selectively by way of switching means to a single decoder means.

References Cited

UNITED STATES PATENTS

| | | | |
|---|---|---|---|
| 3,076,374 | 2/1963 | De Neergaard | 88—14 |
| 3,114,046 | 12/1963 | Cabaniss et al. | 250—235 |
| 3,153,111 | 10/1964 | Barber et al. | 250—237 |
| 3,223,845 | 12/1965 | Wales | 250—220 X |
| 3,285,123 | 11/1966 | Rantsch et al. | 88—14 |
| 3,303,347 | 2/1967 | Wingate | 250—220 |
| 3,351,768 | 11/1967 | Cooke | 250—237 |

JAMES W. LAWRENCE, Primary Examiner

V. LAFRANCHI, Assistant Examiner

U.S. Cl. X.R.

250—219, 220; 356—167, 169